United States Patent

Harris, Jr.

[11] 4,447,592
[45] May 8, 1984

[54] ANISOTROPIC MELT POLYESTERS OF 6-HYDROXY-2-NAPHTHOIC ACID

[75] Inventor: John F. Harris, Jr., Wilmington, Del.

[73] Assignee: E. I. Du Pont de Nemours and Company, Wilmington, Del.

[21] Appl. No.: 503,651

[22] Filed: Jun. 13, 1983

[51] Int. Cl.³ .............................................. C08G 63/60
[52] U.S. Cl. .................................... 528/128; 528/125; 528/190; 528/191; 528/220; 528/271
[58] Field of Search ............... 528/125, 128, 190, 191, 528/271, 220

[56] References Cited

U.S. PATENT DOCUMENTS

| | | | |
|---|---|---|---|
| 4,219,461 | 8/1980 | Calundann | 260/40 P |
| 4,226,970 | 10/1980 | Frazer | 528/128 |
| 4,232,143 | 11/1980 | Irwin | 528/128 |
| 4,245,082 | 1/1981 | Irwin | 528/128 |
| 4,256,624 | 3/1981 | Calundann | 528/150 |
| 4,269,965 | 5/1981 | Irwin | 528/128 |
| 4,276,226 | 6/1981 | Clement et al. | 260/410.5 |
| 4,318,842 | 3/1982 | East et al. | 524/605 |

Primary Examiner—Lester L. Lee

[57] ABSTRACT

Melt-processible polyester which is optically anisotropic in the melt phase and which consists essentially of the following molar amounts of the recurring units, with the sum of the molar amounts being 100%:

(a) about 20 to about 85%, of

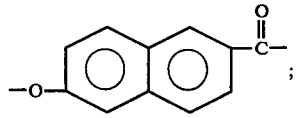

(b) about 15 to about 80% of approximately equimolar amounts of

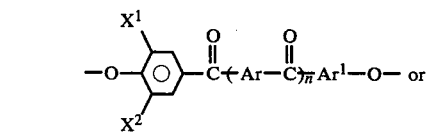 (i)

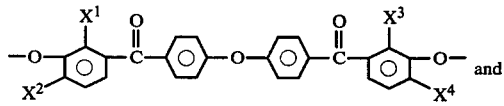

and

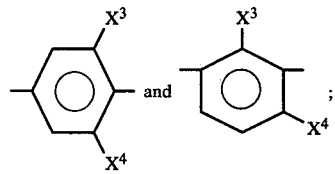 (ii)

wherein
each of $X^1$, $X^2$, $X^3$, and $X^4$ is independently selected from H, Cl, and $CH_3$;
Ar is selected from 1,4-phenylene, 1,3-phenylene, 4,4'-oxybiphenylene, 4,4'-biphenylene, and 2,6-naphthylene;
$Ar^1$ is selected from and
n is 0 or 1.

13 Claims, No Drawings

ANISOTROPIC MELT POLYESTERS OF 6-HYDROXY-2-NAPHTHOIC ACID

BACKGROUND OF THE INVENTION

1. Technical Field

This invention relates to fiber-forming melt-processible polyesters that exhibit optical anisotropy in the melt.

2. Background and Objects

Melt-processible, wholly aromatic polyesters which form optically anisotropic melt phases (AMP) are known in the art.

U.S. Pat. No. 4,318,842 discloses melt-processible AMP polyesters which can be prepared from 6-hydroxy-2-naphthoic acid (20–90 mol %), 1,4-cyclohexanedicarboxylic acid (5–40 mol %), an aromatic diol HO-Ar-OH (10–40 mol %) and an aromatic diacid $HO_2C$-Ar-$CO_2H$ (10–40 mol %). AMP polyesters are also disclosed in U.S. Pat. No. 4,219,461; these can be prepared from 6-hydroxy-2-naphthoic acid (20–40 mol %), 4-hydroxybenzoic acid (10–50 mol %), an aromatic diol (5–30 mol %), and an aromatic diacid (5–30 mol %). U.S. Pat. No. 4,318,841 discloses melt-processible AMP polyesters which can be prepared from 6-hydroxy-2-naphthoic acid (5–60 mol %), 4-hydroxybenzoic acid (5–70 mol %), terephthalic acid (10–45 mol %), and resorcinol (10–45 mol %). U.S. Pat. No. 4,256,624 discloses melt-processible AMP polyesters which can be prepared from 6-hydroxy-2-naphthoic acid (10–90 mol %), an aromatic diol HO-Ar-OH (5–45 mol %), and an aromatic diacid (5–45 mol %).

U.S. Pat. No. 4,269,965 discloses fiber-forming copolyesters which are melt-anisotropic and consist essentially of

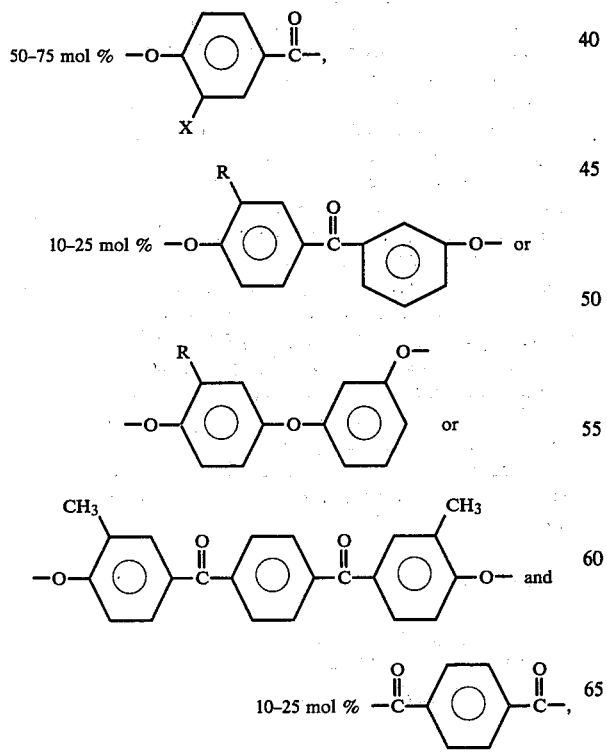

wherein X and R are independently H, $CH_3$ or Cl. U.S. Pat. No. 4,232,143 discloses fiber-forming AMP polyesters consisting essentially of

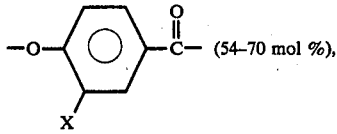

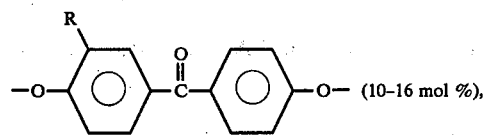

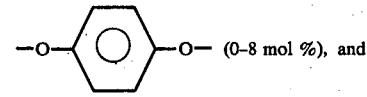

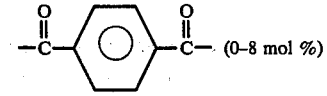

wherein X and R are independently H, $CH_3$, or Cl. U.S. Pat. No. 4,245,082 discloses fiber-forming melt-anisotropic polyesters which consist essentially of substantially equimolar amounts of

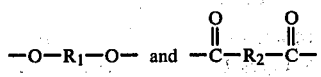

wherein $R_1$ in at least 85 mol % of the dioxy units is

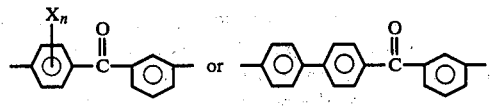

wherein X is $CH_3$ or Cl and n is 0, 1, or 2, and $R_2$ in at least 85 mol % of the diacyl units is p-phenylene, 2,6-naphthylene, or p,p'-biphenylene.

U.S. Pat. No. 4,276,226 discloses diketodiols and diesters of the formula

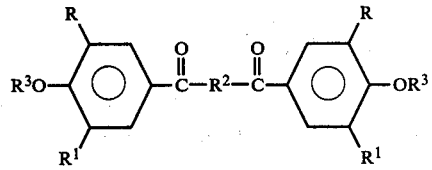

wherein R is independently methyl or chloro, $R^1$ is independently hydrogen or R, $R^2$ is 1,4-phenylene, 1,3-phenylene, 2,6-naphthylene, 4,4'-biphenylene, or 4,4'-biphenylene ether, and $R^3$ is hydrogen or

wherein $R^4$ is a hydrocarbon group of 1–10 carbon atoms. Also disclosed is the reaction of the above with aromatic diacids to form melt-spinnable polyesters. U.S.

Pat. No. 4,226,970 discloses melt-processible AMP polyesters, and high modulus filaments thereof, consisting essentially of

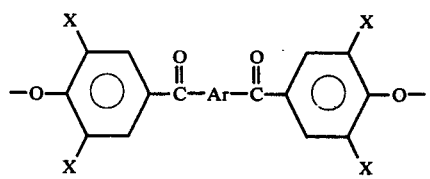

wherein X is CH₃ or Cl and Ar is 1,3- or 1,4-phenylene, and

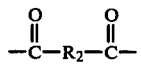

wherein $R_2$ is selected from a variety of diradicals, including 1,4-phenylene.

It is an object of this invention to provide novel wholly aromatic polyesters. Another object is to provide such polyesters which form anisotropic melts and which are highly melt processible, for example, into shaped articles, including fibers and filaments, particularly the modulus of which can be increased by heat treatment. Other objects will become apparent hereinafter.

DETAILED DESCRIPTION OF THE INVENTION

For further comprehension of the invention and of the objects and advantages thereof, reference may be made to the following description and to the appended claims in which the various novel features of the invention are more particularly set forth.

The invention herein resides in the melt-processible polyester which is optically anisotropic in the melt phase and which consists essentially of the following molar amounts of the recurring units, with the sum of the molar amounts being 100%:

(a) about 20 to about 85%, preferably 30 to 75%, more preferably 40 to 70%, of

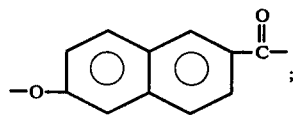

(b) about 15 to about 80%, preferably 25 to 70%, more preferably 30 to 60%, of approximately equimolar amounts of

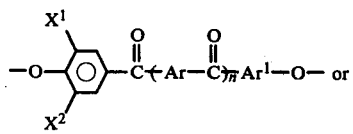 (i)

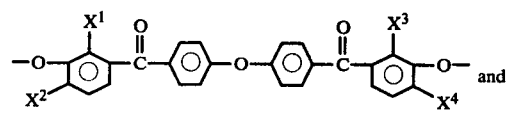 and

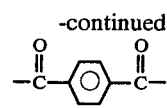 (ii)

wherein
each of $X^1$, $X^2$, $X^3$, and $X^4$ is independently selected from H, Cl, and CH₃;
Ar is selected from 1,4-phenylene, 1,3-phenylene, 4,4'-oxybiphenylene, 4,4'-biphenylene, and 2,6-naphthylene;
$Ar^1$ is selected from

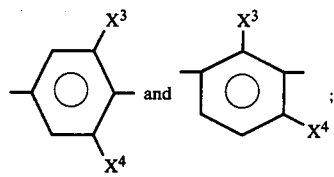

n is 0 or 1.

The preferred dioxy unit (b) (i) is the one of the first formula shown wherein n is 0. Of this type, more preferred is that wherein at least one of $X^1$, $X^2$, $X^3$, and $X^4$ is Cl or that wherein $X^1$ and $X^2$ are H and $Ar^1$ is 1,3-phenylene.

The invention also resides in shaped articles, including fibers and filaments, of the aforesaid melt-processible AMP polyesters, the fibers and filaments of which can be heat-strengthened by conventional means.

By "consisting essentially of" is meant that the AMP polymers of this invention must include the repeat units recited above, in the recited molar amounts. It is not intended to exclude the presence of other polyester repeat units which do not substantially adversely affect the desirable physical and chemical properties of the polyesters of the invention.

The polyesters of this invention may be prepared by standard melt-polymerization methods from 6-hydroxy-2-naphthoic acid (HNA), terephthalic acid and the appropriate aromatic mono- or diketodiols that provide the units described above. It is ordinarily preferred to employ the diols in the form of diesters because the esters can usually be prepared in high purity, of importance in the preparation of high molecular weight polyesters. It also is preferable to employ HNA in the form of a 6-acyloxy-2-naphthoic acid ester for the same reason. The diol corresponding to the first formula given in (b) (i), and its diester, are known compounds. The monoketodiol (n is 0) can be prepared by reacting, under anhydrous conditions, the appropriate $X^1,X^2$-substituted monophenol and the appropriate hydroxyacid HO₂C-Ar¹-OH in hydrogen fluoride in the presence of boron trifluoride. Reaction temperature can be in the range of about 0°–100° C. The diketodiol can be similarly prepared by reacting the appropriate hydroxyacids.

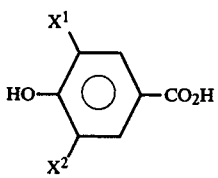

and HO₂C—Ar¹—OH with the appropriate aromatic hydrocarbon H—Ar—H; or by reacting the appropriate monophenols

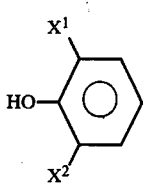

and H—Ar¹—OH with the appropriate dicarboxylic acid HO₂C—Ar—CO₂H.

The diketodiol corresponding to the second formula given in (b) (i), wherein the terminal aromatic rings are meta-oriented, can be similarly prepared by reacting 2,4-$X^1$,$X^2$-substituted 3-hydroxybenzoic acid and 2,4-$X^3$,$X^4$-substituted 3-hydroxybenzoic acid with diphenyl ether.

The diol-forming reaction can be conveniently carried out on an approximately molar scale, with the reactants being charged to a 1 L shaker tube (Hastalloy ®C) which is then cooled and evacuated. Liquid HF is added, then BF₃ in slight excess of such amount as to provide one mole for each mole of water produced and one mole for each mole of carbonyl functionality. On an approximately one molar scale, the combined amounts of reactants, HF and BF₃ total about 700 g. The reaction time is generally about 4 to 18 h. The product is discharged onto 2 L of ice (no water), then made up to 2.5 L with water and stirred vigorously. If the product is crystalline, it can be recovered by filtration; if it is not, sufficient methylene chloride is added to dissolve the product and, after pH adjustment to 7-8 with aqueous ammonia, the organic phase is separated from the aqueous phase and the product is recovered from the organic phase by evaporation.

Diols prepared by the above procedure can be conveniently purified by conversion to esters, preferably acetate esters, by treatment with the appropriate carboxylic acid anhydride, for example, acetic anhydride. Acetylation of diols is accomplished with acetic anhydride, for example, 4 moles of acetic anhydride/mole of diol, in sufficient acetic acid to ensure adequate fluidity for stirring, for example, 1 to 2 L of acetic acid/mole of diol. The reaction is conveniently run overnight at ambient temperature with acid catalysts, for example, 10 g of trifluoromethanesulfonic acid/mole of diol, or under reflux for 4 h with base catalysis, for example, 80 g of sodium acetate/mole of diol. The base-catalyzed acetylation usually produces purer product. When reaction is complete, the acid catalyst, if present, is neutralized with sodium acetate, and the reaction mixture is diluted to twice its volume with ice and water. Product is isolated by filtration, washed with water, dried, and further purified by crystallization from an appropriate solvent.

As a representative example, in the preparation of 4,4'-bis(3-acetoxybenzoyl)diphenyl ether, 0.5 mole of diphenyl ether, 1.0 mole of 3-hydroxybenzoic acid, 2.5 moles of BF₃ and 300 g of HF were reacted in accordance with the above procedure for 4 h at 30° C. The recovered diol product was acetylated as described above, and the desired diphenyl ether derivative was recovered and recrystallized from ethyl acetate/dimethylacetamide; yield 57%; melting point 159.5°–160.5° C.

In preparing the polyesters of the invention, diols or diesters, preferably diesters, most preferably diacetates, and terephthalic acid are normally combined, in substantially equimolar amounts, with 20 to 85 mole percent of HNA or, preferably, its acyloxyester, most preferably its acetoxyester, and heated in a stirred reaction vessel in an inert atmosphere, e.g., under nitrogen, or in vacuum, with stirring for about 30 minutes to 36 h. An excess of either terephthalic acid or diol (diester) of up to 10 mole percent over stoichiometric can be used without detriment. Temperatures employed for the polymerization are above the melting points of at least one of the reactants and are generally in the range of about 200° to about 350° C. The reaction vessel is equipped with means to permit by-product removal during polymerization, for example, a combined distillation head-condenser.

Reaction is generally initiated at about 200° to 290° C. and the temperature is gradually raised in stages as polymerization proceeds. Towards the end of the polymerization the molten polymer can be placed under reduced pressure and heated further to complete by-product removal and polymerization. Optionally, the molten polymer can be transferred directly to an appropriate apparatus for preparation of shaped articles, e.g., a fiber spinning unit. Polymerization conditions, such as temperature, duration of heating, and pressure, can be varied, consistent with the reactants employed and the degree of polymerization desired.

In an alternative, but less preferred, procedure, the diacid, diols, and HNA can be employed in the form of diesters. In such cases, a catalyst such as dibutyl tin oxide may be desirable.

The polyesters of this invention have molecular weights and melting points which make them suitable for melt-spinning into filaments and for molding into films and shaped articles. Filaments may be spun by conventional melt-spinning techniques. A melt of the polymer can be extruded through a spinneret into a quenching atmosphere (e.g., air or nitrogen maintained at room temperature) and wound up. General spinning conditions which are operable herein are given in U.S. Pat. No. 4,066,620. As used herein, the term "as-spun fiber" refers to a fiber which has not been drawn or heat treated after extrusion and normal windup.

The as-spun fibers of this invention can be subjected to heat-treatment in an oven, while relaxed, to provide high strength fibers which are useful for a variety of industrial applications, such as plastic and rubber reinforcement. In the heat treating process fiber samples, as skeins or on bobbins, preferably collapsible bobbins, are usually heated in an inert atmosphere that is continuously purged by flow of inert gas, such as nitrogen, through the oven to remove by-products from the vicinity of the fiber. Temperatures approaching the fusion point but sufficiently below to prevent interfilament fusion are employed. Preferably, the maximum temperature is reached in a stepwise or gradual fashion.

Inherent viscosity ($\eta_{inh}$) is defined by the equation $$\eta_{inh} = (\ln (\eta_{rel})/C)$$

wherein ($\eta_{rel}$) represents the relative viscosity and C represents a concentration of 0.25 gram of the polymer in 100 mL of solvent. The relative viscosity ($\eta_{rel}$) is determined by dividing the flow time in a capillary viscometer of the dilute solution by the flow time for the pure solvent. Flow times are determined at 25° C., and the solvent is 1:1 hexafluoroisopropanol/-chloroform except where otherwise indicated.

Fiber tensile properties are reported in conventional units as follows (conversion factors for SI units are given in parentheses):

| | |
|---|---|
| Denier | in g/9000m (1.11 dtex) |
| Tensile Strength (Tenacity) | in g/denier (0.89 dN/tex) |
| Elongation | in percent of unstretched length |
| Initial Modulus | in g/denier (0.89 dN/tex) |

They are measured, using the procedures disclosed in U.S. Pat. No. 3,827,998, on fibers that have been conditioned for at least one hour. At least three breaks are averaged.

The Thermooptical Test (TOT), which involves heating a polymer sample between crossed (90°) polarizers on the heating stage of a polarizing microscope, is fully described in U.S. Pat. No. 4,066,620. Polymers that pass this test (+) are considered to be optically anisotropic in the molten state.

The melting behavior and fiber-forming capability of the polyesters of this invention were determined by heating a sample of the polymer on a metal block as described in the ensuing examples which are illustrated of the present invention. The polymer flow temperature was determined on the hot state polarizing microscope.

In the following examples, all temperatures are in degrees Celsius unless otherwise indicated. Pertinent data regarding the polyesters prepared in the examples are summarized in Tables 1 to 5 which follow the examples.

EXAMPLE 1

Copolyester of Terephthalic Acid and 3-Methyl-4,3'dihydroxybenzophenone, Containing 2 Moles of 6-Hydroxy-2-naphthoic Acid per Mole of Terephthalic Acid All equipment was dried in an oven at 135° and allowed to cool in a nitrogen atmosphere. In a 200 mL flask was placed 11.06 g (0.04804 mol) of 6-acetoxy-2-naphthoic acid, 3.99 g (0.02402 mol) of terephthalic acid, and 7.88 g (0.02523 mol) of 3-methyl-4,3'-diacetoxybenzophenone. The flask was fitted with a 15 cm extension tube and a short path still head which had a small paddle stirrer inserted into it reaching to the bottom of the reactor, and a small round bottomed flask as receiver. The assembled set-up was connected to a nitrogen bubbler, and then the mixture was heated in an oil bath, stirred and evacuated according to the following schedule:

| Oil Bath Temp. | | |
|---|---|---|
| 236–240° | 1 h | |
| 280° | 2 h | stirred |
| 300° | 1 h | |
| 325° | 0.5 h | (0.10 mm) |

The reactor was allowed to cool under vacuum. The polymer was isolated, broken up and dried in a vacuum oven at 150° for about 16 h; weight, 14.6 g. The inherent viscosity of the polymer was 0.89 (0.25% in 1:1 hexafluoroisopropanol:chloroform at 25°). The polyester, when heated between crossed polarizers on a hot stage microscope, flowed at 169° (polymer flow temp.) TOT was positive. Tests on a gradient hot metal bar showed that fibers could be drawn from this material beginning at 210° (hand-drawn fiber temp.) and that the polymer melted at 250° (polymer melting temp).

The polyester was mechanically melt-spun at 225°–245° (spinneret temperature), and the lustrous, almost colorless filament which was collected at 245° (wind-up speed of 1200 meters per minute) had the following properties (average of five 2.54 cm breaks measured on single filaments):

Tensile strength = 3.97 dN/tex
Elongation = 1.7%
Initial Modulus = 294 dN/tex
Denier = 2.00

EXAMPLE 2

Copolyester of Terephthalic Acid and 3-Chloro-4,3'dihydroxybenzophenone, Containing 4 Moles of 6-Hydroxy-2-naphthoic Acid per Mole of Terephthalic Acid A mixture of 13.84 g (0.06012 mol) of 6-acetoxy-2-naphthoic acid, 2.50 g (0.01505 mol) of terephthalic acid and 5.00 g (0.01503 mol) of 3-chloro-4,3'-diacetoxybenzophenone was treated by the procedure substantially as described in Example 1. There was obtained 14.6 g of polymer which had an inherent viscosity of 1.10 (0.10% in pentafluorophenol at 60°). Tests on a gradient hot metal bar showed that fibers could be drawn from this material beginning at 250°, and that the polymer melted at 280°.

This polyester was mechanically melt-spun at 277° and the lustrous, almost colorless fiber that was wound up at 1000 meters per minute had the following properties (average of five 2.54 cm breaks measured on single filaments):

Tensile Strength = 4.16 dN/tex
Elongation = 1.6%
Initial Modulus = 330 dN/tex
Denier = 2.65

The tensile strength of the filaments was increased by heating them in a nitrogen atmosphere according to the following schedule:

Rm. Temp.-150° ~1 h
150°–280° 6 h
280° 10 h
270°–150° ~6 h

After this heat treatment, values of tensile strength and initial modulus up to 15.8 dN/tex (average: 12.9) and 371 dN/tex (average: 341), respectively, were obtained for the filaments (average of five 2.54 cm breaks).

EXAMPLES 3–47

Copolyesters of terephthalic acid, 6-hydroxy-2-naphthoic acid and various ketodiols were prepared following the procedure substantially as described in Example 1. The reactants used to prepare the polymers and properties of the copolyester products are summarized in Table 3. In every case, fibers were hand-drawn or films were pressed from the copolyesters at the temperatures shown in Table 3 (HFT, FPT). All the polymers which were tested passed the TOT test (+).

Copolyesters from twenty-six of the examples were mechanically melt-spun at spinneret temperatures of 234° to 340°, and the fibers were wound up at speeds of 400 to 1800 m/min (Table 4). Tensile properties of single filaments of the fibers were measured as-spun at room temperature (Table 5, fiber treatment 1) and, in selected examples, after heat-treatment under nitrogen at 240° to 300° for periods of up to 12 h, substantially as described in Example 2 (Table 5, fiber treatment 2). Properties given in Table 5 represent the average of five 2.54 cm breaks.

TABLE 1

Polyesters of HNA, Terephthalic Acid and Monoketodiols ("n" is 0 in first diol of Formula (b)(i))

| Example | Ar¹ | X¹ | X² | X³ | X⁴ | Mol % HNA |
|---|---|---|---|---|---|---|
| 1 | b | CH₃ | H | H | H | 50.0 |
| 2 | b | Cl | H | H | H | 66.7 |
| 3 | a | H | H | H | H | 60.0 |
| 4 | a | CH₃ | H | H | H | 60.0 |
| 5 | a | CH₃ | H | H | H | 66.7 |
| 6 | a | CH₃ | CH₃ | CH₃ | CH₃ | 60.0 |
| 7 | a | Cl | H | H | H | 60.0 |
| 8 | a | Cl | H | H | H | 66.7 |
| 9 | a | Cl | H | H | H | 71.4 |
| 10 | a | Cl | H | H | H | 75.0 |
| 11 | a | Cl | Cl | H | H | 60.0 |
| 12 | a | Cl | Cl | Cl | H | 60.0 |
| 13 | a | Cl | Cl | Cl | H | 66.7 |
| 14 | a | Cl | Cl | Cl | Cl | 60.0 |
| 15 | a | Cl | Cl | Cl | Cl | 66.7 |
| 16 | a | Cl | Cl | Cl | Cl | 71.4 |
| 17 | b | H | H | H | H | 33.3 |
| 18 | b | H | H | H | H | 60.0 |
| 19 | b | H | H | H | H | 71.4 |
| 20 | b | CH₃ | H | H | H | 60.0 |
| 21 | b | CH₃ | H | H | H | 66.7 |
| 22 | b | CH₃ | CH₃ | H | H | 60.0 |
| 23 | b | Cl | H | H | H | 50.0 |
| 24 | b | Cl | H | H | H | 60.0 |
| 25 | b | Cl | H | H | H | 71.4 |
| 26 | b | Cl | Cl | H | H | 60.0 |
| 27 | b | Cl | Cl | H | H | 71.4 |

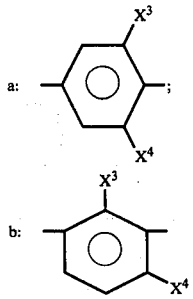

TABLE 2

Polyesters of HNA, Terephthalic Acid and Diketodiols (Examples 28–50: "n" is 1 in first diol of Formula (b) (i); Example 51: second diol of Formula (b) (i))

| Example | Ar | Ar¹ | X¹ | X² | X³ | X⁴ | Mol % HNA |
|---|---|---|---|---|---|---|---|
| 28 | c | a | CH₃ | H | CH₃ | H | 60.0 |
| 29 | c | a | CH₃ | CH₃ | CH₃ | CH₃ | 60.0 |
| 30 | c | a | Cl | H | Cl | H | 60.0 |
| 31 | c | a | Cl | Cl | Cl | Cl | 60.0 |
| 32 | d | a | CH₃ | H | CH₃ | H | 60.0 |
| 33 | d | a | CH₃ | CH₃ | CH₃ | CH₃ | 60.0 |
| 34 | d | a | Cl | H | Cl | H | 60.0 |
| 35 | d | a | Cl | Cl | Cl | Cl | 60.0 |
| 36 | e | a | CH₃ | H | CH₃ | H | 60.0 |
| 37 | e | a | CH₃ | CH₃ | CH₃ | CH₃ | 60.0 |
| 38 | e | a | Cl | H | Cl | H | 60.0 |
| 39 | e | a | Cl | Cl | Cl | Cl | 60.0 |
| 40 | f | a | CH₃ | H | CH₃ | H | 60.0 |
| 41 | f | a | CH₃ | CH₃ | CH₃ | CH₃ | 60.0 |
| 42 | f | a | Cl | H | Cl | H | 60.0 |
| 43 | g | a | H | H | H | H | 60.0 |
| 44 | g | a | CH₃ | H | CH₃ | H | 60.0 |
| 45 | g | a | CH₃ | CH₃ | CH₃ | CH₃ | 60.0 |
| 46 | g | a | Cl | H | Cl | H | 60.0 |
| 47 | g | a | Cl | H | Cl | H | 66.7 |
| 48 | g | a | Cl | H | Cl | H | 71.4 |
| 49 | g | a | Cl | H | Cl | H | 75.0 |
| 50 | g | a | Cl | Cl | Cl | Cl | 60.0 |
| 51 | g | b | H | H | H | H | 60.0 |

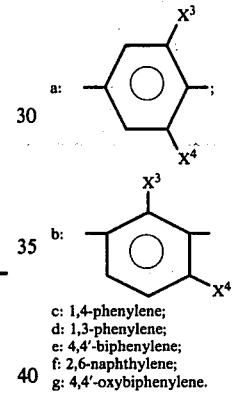

c: 1,4-phenylene;
d: 1,3-phenylene;
e: 4,4'-biphenylene;
f: 2,6-naphthylene;
g: 4,4'-oxybiphenylene.

TABLE 3

| | Reactants (moles) | | | Polymer Properties | | | | |
|---|---|---|---|---|---|---|---|---|
| Ex. | HNA | Diol | T | Inh Viscosity | PMT (°) | PFT (°) | HFT (°) | FPT (°) | TOT |
| 3 | .06034 | .02012 | .02010 | 1.22ᵃ | 315 | 303 | * | 300 | + |
| 4 | .04344 | .01521 | .01451 | 0.45 | 231 | 225 | 204 | nm | + |
| 5 | .04292 | .01073 | .01071 | 0.59ᵃ | 317 | 278 | * | 300 | + |
| 6 | .05417 | .01806 | .01806 | 0.48ᵃ | 384 | 181 | * | 260 | + |
| 7 | .05408 | .01803 | .01806 | 0.96 | 269 | 246 | 253 | nm | + |
| 8 | .04817 | .01205 | .01204 | 1.12ᵃ | 302 | nm | 253 | nm | nm |
| 9 | .04513 | .00902 | .00903 | 1.60ᵃ | 317 | nm | 302 | nm | nm |
| 10 | .04513 | .00751 | .00752 | 1.63ᵃ | 336 | 303 | 317 | nm | + |
| 11 | .04513 | .01506 | .01505 | 1.60 | 304 | 220 | 259 | nm | + |
| 12 | .04483 | .01494 | .01493 | 1.66 | 321 | 216 | 258 | nm | + |
| 13 | .04978 | .01245 | .01246 | 0.92ᵃ | 308 | nm | 292 | nm | nm |
| 14 | .05504 | .01834 | .01836 | 1.02 | 297 | 205 | 280 | nm | + |
| 15 | .04817 | .01204 | .01204 | 0.99ᵃ | 302 | nm | 285 | nm | nm |
| 16 | .04513 | .00903 | .00903 | 0.94ᵃ | 336 | nm | 317 | nm | nm |
| 17 | .03353 | .03353 | .03353 | 0.66 | 223 | 176 | 198 | nm | + |
| 18 | .06034 | .03012 | .02010 | 0.83 | 255 | nm | 217 | nm | nm |
| 19 | .05030 | .01006 | .01005 | 0.96ᵃ | 298 | nm | 298 | nm | nm |

TABLE 3-continued

| | Reactants (moles) | | | Polymer Properties | | | | | |
|---|---|---|---|---|---|---|---|---|---|
| Ex. | HNA | Diol | T | Inh Viscosity | PMT (°) | PFT (°) | HFT (°) | FPT (°) | TOT |
| 20 | .04322 | .01515 | .01439 | 0.70 | 250 | 183 | 209 | nm | + |
| 21 | .04483 | .01121 | .01120 | 0.93$^a$ | 299 | nm | 281 | nm | nm |
| 22 | .04344 | .01477 | .01451 | 0.78$^a$ | 312 | 268 | * | 260 | + |
| 23 | .04809 | .02404 | .02402 | 0.89 | 250 | 176 | 222 | nm | + |
| 24 | .05417 | .01896 | .01806 | 0.97 | 254 | 240 | 225 | nm | + |
| 25 | .04509 | .00902 | .00903 | 0.73$^a$ | 300 | nm | * | 260 | nm |
| 26 | .04513 | .01506 | .01505 | 1.17 | 283 | nm | 243 | nm | nm |
| 27 | .04765 | .00953 | .00951 | 1.26$^a$ | 317 | 303 | 300 | nm | + |
| 28 | .04344 | .01519 | .01451 | 0.88 | 314 | 275 | 206 | nm | + |
| 29 | .04344 | .01520 | .01451 | 0.17$^a$ | 330 | 338 | 295 | nm | + |
| 30 | .04344 | .01477 | .01451 | 0.98$^a$ | 328 | 312 | 312 | nm | + |
| 31 | .04344 | .01520 | .01451 | 0.58 | 370 | 318 | 295 | nm | + |
| 32 | .04513 | .01505 | .01505 | 0.99 | 248 | 159 | 220 | nm | + |
| 33 | .04513 | .01505 | .01505 | 0.49$^a$ | 382 | 172 | * | 260 | + |
| 34 | .03549 | .01182 | .01186 | 0.45 | 223 | 199 | 180 | nm | + |
| 35 | .04344 | .01448 | .01451 | 0.87 | 294 | 201 | 233 | nm | + |
| 36 | .04344 | .01520 | .01451 | 0.84 | nm | 354 | 389 | nm | + |
| 37 | .04492 | .01497 | .01499 | >0.22$^a$ | 410 | nm | 369 | nm | nm |
| 38 | .05482 | .01827 | .01830 | 0.43$^a$ | 347 | 345 | * | 300 | + |
| 39 | .03892 | .01298 | .01300 | 0.77 | 370 | 209 | 250 | nm | + |
| 40 | .04344 | .01521 | .01451 | 0.63 | 369 | 334 | * | 300 | + |
| 41 | .04344 | .01520 | .01451 | 0.40$^a$ | 262 | 289 | 215 | nm | + |
| 42 | .05417 | .01805 | .01806 | 0.67$^a$ | 353 | 353 | * | 300 | + |
| 43 | .06068 | .02022 | .02023 | 0.55$^a$ | 387 | 354 | * | 320 | + |
| 44 | .04344 | .01520 | .01451 | 0.79 | 370 | 257 | 235 | nm | + |
| 45 | .04344 | .01520 | .01451 | 0.15$^a$ | 330 | 229 | * | 230 | + |
| 46 | .04513 | .01505 | .01505 | 1.03 | 253 | 179 | 213 | nm | + |
| 47 | .04817 | .01202 | .01204 | 0.86 | 289 | nm | 244 | nm | nm |
| 48 | .04439 | .00888 | .00885 | 0.80$^a$ | 354 | nm | 267 | nm | nm |
| 49 | .04513 | .00753 | .00752 | 0.75$^a$ | 317 | nm | * | 300 | nm |
| 50 | .04344 | .01447 | .01451 | 0.84 | 311 | 193 | 246 | nm | + |
| 51 | .03558 | .01185 | .01186 | 0.28$^a$ | 330 | 144 | 262 | nm | + |

HNA: 6-Hydroxy-2-naphthoic Acid
T: Terephthalic Acid
PMT (°): Polymer Melting Temperature
PFT (°): Polymer Flow Temperature
HFT (°): Temperature at which fibers were hand-drawn
FPT (°): Temperature at which films were pressed
a: Inherent viscosity measured on a 0.10% solution in pentafluorophenol at 60°
nm: Not measured
*: Not measurable; fibers could not be drawn

TABLE 4

| Example | Extrusion Temp. (°) | Spinneret Temp. (°) | Wind-Up Speed (m/min) | Denier |
|---|---|---|---|---|
| 7 | 215 | 255 | 1500 | 1.59 |
| 8 | 235 | 306 | 1500 | 2.61 |
| 9 | 240 | 313 | 1500 | 2.04 |
| 11 | 220 | 287 | 900 | 3.01 |
| 12 | 220 | 282 | 800 | 3.09 |
| 13 | 235 | 335 | 1000 | 5.37 |
| 14 | 210 | 314 | 1400 | 2.61 |
| 15 | 215 | 316 | 1000 | 3.89 |
| 17 | 190 | 233 | 700 | 4.18 |
| 18 | 210 | 261 | 1800 | 2.01 |
| 19 | 235 | 312 | 1500 | 3.37 |
| 20 | 225 | 283 | 1500 | 1.78 |
| 21 | 240 | 311 | 1200 | 2.61 |
| 23 | 200 | 234 | 400 | 6.52 |
| 24 | 210 | 262 | 1500 | 1.82 |
| 26 | 210 | 270 | 500 | 4.58 |
| 27 | 245 | 325 | 1000 | 4.13 |
| 28 | 235 | 294 | 1000 | 3.22 |
| 32 | 200 | 257 | 600 | 7.70 |
| 35 | 235 | 300 | 500 | 4.78 |
| 39 | 240 | 339 | 700 | 3.90 |
| 44 | 200 | 290 | 600 | 4.42 |
| 46 | 220 | 286 | 1200 | 2.02 |
| 47 | 225 | 292 | 1600 | 1.96 |
| 48 | 240 | 320 | 1500 | 1.61 |
| 50 | 225 | 295 | 700 | 3.87 |

TABLE 5

| Example | Fiber Treatment | Tenacity (dN/tex) | Elong (%) | Modulus (dN/tex) | Max Heat Treatment Temp (°) |
|---|---|---|---|---|---|
| 7 | 1 | 2.82 | 2.6 | 165 | — |
| 8 | 1 | 3.67 | 2.7 | 214 | — |
|  | 2 | 12.48 | 7.5 | 158 | 290 |
| 9 | 1 | 4.32 | 2.8 | 259 | — |
|  | 2 | 14.01 | 6.4 | 261 | 290 |
| 11 | 1 | 3.75 | 3.1 | 172 | — |
|  | 2 | 5.69 | 8.7 | 82 | 250 |
| 12 | 1 | 4.23 | 2.8 | 216 | — |
|  | 2 | 4.18 | 3.8 | 135 | 270 |
| 13 | 1 | 3.33 | 1.8 | 236 | — |
|  | 2 | 11.27 | 6.3 | 201 | 290 |
| 14 | 1 | 3.89 | 2.7 | 201 | — |
|  | 2 | 2.47 | 2.5 | 117 | 270 |
| 15 | 1 | 1.33 | 0.7 | 212 | — |
|  | 2 | 2.55 | 2.0 | 148 | 290 |
| 17 | 1 | 4.07 | 2.1 | 288 | — |
| 18 | 1 | 3.37 | 1.3 | 297 | — |
|  | 2 | 5.06 | 1.5 | 365 | 280 |
| 19 | 1 | 3.05 | 0.9 | 359 | — |
|  | 2 | 15.56 | 4.4 | 418 | 280 |
| 20 | 1 | 2.67 | 1.1 | 276 | — |
|  | 2 | 4.49 | 1.8 | 320 | 280 |
| 21 | 1 | 3.74 | 1.3 | 323 | — |
|  | 2 | 7.50 | 3.4 | 306 | 290 |
| 23 | 1 | 4.69 | 2.0 | 299 | — |
| 24 | 1 | 4.76 | 2.2 | 304 | — |
|  | 2 | 5.00 | 2.2 | 279 | 240 |
| 26 | 1 | 3.72 | 1.6 | 275 | — |
| 27 | 1 | 1 37 | 0.5 | 282 | — |

TABLE 5-continued

| Example | Fiber Treatment | Tenacity (dN/tex) | Elong (%) | Modulus (dN/tex) | Max Heat Treatment Temp (°) |
|---|---|---|---|---|---|
| | 2 | 5.30 | 2.3 | 274 | 290 |
| 28 | 1 | 3.15 | 1.4 | 246 | — |
| | 2 | 7.65 | 4.1 | 239 | 290 |
| 32 | 1 | 2.27 | 1.6 | 170 | — |
| 35 | 1 | 2.14 | 1.3 | 176 | — |
| | 2 | 2.76 | 2.1 | 164 | 290 |
| 39 | 1 | 2.52 | 1.8 | 164 | — |
| | 2 | 3.59 | 4.7 | 102 | 290 |
| 44 | 1 | 1.43 | 1.1 | 132 | — |
| 46 | 1 | 3.95 | 3.7 | 202 | — |
| 47 | 1 | 3.57 | 2.4 | 229 | — |
| | 2 | 10.31 | 5.9 | 241 | 300 |
| 48 | 1 | 3.28 | 1.6 | 217 | — |
| | 2 | 6.48 | 3.7 | 226 | 290 |
| 50 | 1 | 2.98 | 2.2 | 168 | — |

Although the description herein includes preferred embodiments of the invention, it is to be understood that there is no intent to limit the invention to the precise constructions herein disclosed, and it is to be further understood that the right is reserved to all changes and modifications coming within the scope of the invention as defined in the appended claims.

I claim:

1. Melt-processible polyester which is optically anisotropic in the melt phase and which consists essentially of the following molar amounts of the recurring units, with the sum of the molar amounts being 100%:

(a) about 20 to about 85%, of

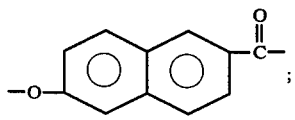

(b) about 15 to about 80% of approximately equimolar amounts of

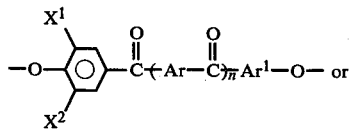  (i)

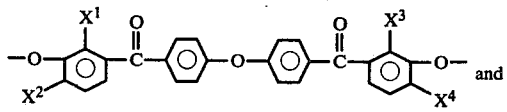 and

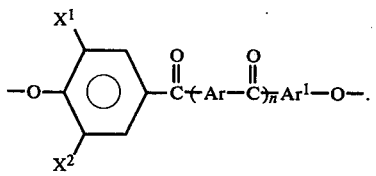 (ii)

wherein
each of $X^1$, $X^2$, $X^3$, and $X^4$ is independently selected from H, Cl, and $CH_3$;
Ar is selected from 1,4-phenylene, 1,3-phenylene, 4,4'-oxybiphenylene, 4,4'-biphenylene, and 2,6-naphthylene;
$Ar^1$ is selected from

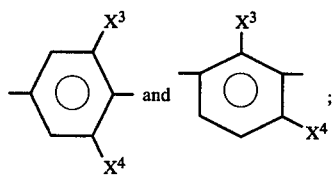

and
n is 0 or 1.

2. Polyester of claim 1 wherein the amount of (a) is 30 to 75% and the amount of (b) is 25 to 70%.

3. Polyester of claim 1 wherein the amount of (a) is 40 to 70% and the amount of (b) is 30 to 60%.

4. Polyester of claim 1 wherein repeat unit (i) is $$-O-\underset{X^2}{\overset{X^1}{\bigcirc}}-\overset{O}{\underset{\|}{C}}(Ar-\overset{O}{\underset{\|}{C}})_n Ar^1-O-.$$

5. Polyester of claim 4 wherein n is 0.
6. Polyester of claim 5 wherein at least one of $X^1$, $X^2$, $X^3$, and $X^4$ is Cl.
7. Polyester of claim 5 wherein $X^1$ and $X^2$ are H and $Ar^1$ is 1,3-phenylene.
8. Polyester of claim 4 wherein the amount of (a) is 30 to 75% and the amount of (b) is 25 to 70%.
9. Polyester of claim 4 wherein the amount of (a) is 40 to 70% and the amount of (b) is 30 to 60%.
10. Spun article of the polyester of claim 1.
11. Spun article of claim 10 in the form of a filament.
12. Heat treated filament of claim 11.
13. Molded article of the polyester of claim 1.

* * * * *